(12) United States Patent
Gorol et al.

(10) Patent No.: US 10,393,268 B2
(45) Date of Patent: Aug. 27, 2019

(54) ROTARY SHAFT HOUSING AND SEAL

(71) Applicant: SAINT-GOBAIN PERFORMANCE PLASTICS CORPORATION, Solon, OH (US)

(72) Inventors: Andreas Gorol, Krefeld (DE); Mario Boskovski, Duesseldorf (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/129,760

(22) PCT Filed: Mar. 27, 2015

(86) PCT No.: PCT/US2015/023110
§ 371 (c)(1),
(2) Date: Sep. 27, 2016

(87) PCT Pub. No.: WO2015/148986
PCT Pub. Date: Oct. 1, 2015

(65) Prior Publication Data
US 2017/0184201 A1 Jun. 29, 2017

Related U.S. Application Data

(60) Provisional application No. 61/970,959, filed on Mar. 27, 2014.

(51) Int. Cl.
*F16J 15/3228* (2016.01)
*F16J 15/3252* (2016.01)
*F16J 15/3284* (2016.01)

(52) U.S. Cl.
CPC ....... *F16J 15/3228* (2013.01); *F16J 15/3252* (2013.01); *F16J 15/3284* (2013.01)

(58) Field of Classification Search
CPC .. F16J 15/3228; F16J 15/3268; F16J 15/3216; F16J 15/3224; F16J 15/3252; F16J 15/3284
See application file for complete search history.

(56) References Cited

U.S. PATENT DOCUMENTS 2,127,982 A * 8/1938 Northup ............... F16J 15/3228
29/282
2,225,758 A * 12/1940 Stein ...................... F16C 33/76
277/555

(Continued)

FOREIGN PATENT DOCUMENTS

CH          341368 A       9/1959
CN       102454794 A       5/2012

(Continued)

OTHER PUBLICATIONS

Trelleborg Sealing Solutions Document, Jul. 2008 Edition, 36 pages.

(Continued)

*Primary Examiner* — Eugene G Byrd
(74) *Attorney, Agent, or Firm* — Abel Schillinger, LLP; Chi Suk Kim

(57) ABSTRACT

A rotary shaft seal housing including a body having an aperture defining a central axis and an inner surface, the body defining a cavity concentric to the central axis of the aperture and extending outward from the central axis and into the body, and a flange extending inward toward the central axis a distance beyond the inner surface, the flange having a first surface contiguous with the cavity and a second surface opposite the first surface, wherein the cavity is adapted to hold a sealing element, and wherein the first surface is generally smooth.

20 Claims, 3 Drawing Sheets

(56) References Cited

U.S. PATENT DOCUMENTS

| | | | |
|---|---|---|---|
| 2,246,591 A | 6/1941 | Hubbard | |
| 2,264,148 A | 11/1941 | Fisher, Jr. et al. | |
| 3,182,569 A * | 5/1965 | Hieber | F16J 15/3268 277/437 |
| 3,268,984 A * | 8/1966 | Kupchick | F16J 15/3228 277/577 |
| 3,549,445 A * | 12/1970 | McMahon | F16J 15/3228 156/221 |
| 3,901,517 A | 8/1975 | Heathcott | |
| 3,995,868 A | 12/1976 | Smith | |
| 4,145,057 A | 3/1979 | Wheeler | |
| 4,208,060 A | 6/1980 | St. Laurent, Jr. | |
| 4,244,591 A * | 1/1981 | Umetsu | F16J 15/3228 277/436 |
| 4,253,675 A | 3/1981 | St. Laurent, Jr. | |
| 4,300,778 A | 11/1981 | Gagne | |
| 4,311,316 A | 1/1982 | Cather, Jr. | |
| 4,440,405 A | 4/1984 | Schaus et al. | |
| 4,534,569 A * | 8/1985 | Ishitani | B63H 23/321 277/351 |
| 4,553,761 A | 11/1985 | Blesing et al. | |
| 4,568,092 A * | 2/1986 | Hayashida | F16J 15/3216 277/559 |
| 4,583,749 A * | 4/1986 | Hatch | F16J 15/3228 277/551 |
| 4,603,866 A | 8/1986 | Fuchs et al. | |
| 4,613,143 A | 9/1986 | Butler | |
| 4,645,215 A * | 2/1987 | Fuchs | F16J 15/3228 277/309 |
| 4,664,392 A * | 5/1987 | Hatch | F16J 15/3228 277/551 |
| 4,695,063 A | 9/1987 | Schmitt et al. | |
| 4,723,350 A * | 2/1988 | Kobayashi | B23P 15/00 264/159 |
| 4,838,402 A | 6/1989 | Feser | |
| 4,850,601 A | 7/1989 | Maier et al. | |
| 4,964,647 A | 10/1990 | Stephan | |
| 5,460,386 A | 10/1995 | McCoy et al. | |
| 5,607,168 A | 3/1997 | Dahll | |
| 5,649,711 A * | 7/1997 | Jordan | F16J 15/3204 277/560 |
| 5,887,330 A | 3/1999 | Cole et al. | |
| 5,984,316 A | 11/1999 | Balsells | |
| 6,161,834 A | 12/2000 | Pollack et al. | |
| 6,164,660 A | 12/2000 | Goodman | |
| 6,419,236 B1 | 7/2002 | Janian | |
| 7,562,878 B2 | 7/2009 | Dietle et al. | |
| 7,938,407 B2 | 5/2011 | Datta et al. | |
| 8,028,998 B2 | 10/2011 | Schleker et al. | |
| 8,251,373 B2 * | 8/2012 | Lev | F16J 15/3236 277/442 |
| 2004/0119244 A1 | 6/2004 | Duke et al. | |
| 2004/0131475 A1 | 7/2004 | Yokomachi et al. | |
| 2005/0093246 A1 | 5/2005 | Dietle et al. | |
| 2008/0258406 A1 | 10/2008 | Dahlheimer | |
| 2009/0230630 A1 | 9/2009 | Kondo et al. | |
| 2009/0289418 A1 | 11/2009 | Cook | |
| 2010/0163219 A1 | 7/2010 | Gibson, Jr. | |
| 2010/0166582 A1 * | 7/2010 | Racicot | F04B 39/041 417/437 |
| 2010/0242927 A1 * | 9/2010 | Recktenwald | F16J 15/3228 123/568.11 |
| 2012/0099986 A1 | 4/2012 | Hisada et al. | |
| 2012/0292858 A1 * | 11/2012 | Jordan | F16J 15/002 277/558 |
| 2013/0038028 A1 | 2/2013 | Jäck et al. | |
| 2013/0154200 A1 | 6/2013 | Arita | |
| 2013/0202242 A1 | 8/2013 | Corbett et al. | |
| 2013/0256994 A1 | 10/2013 | Claus et al. | |
| 2015/0267816 A1 | 9/2015 | Boskovski | |

FOREIGN PATENT DOCUMENTS

| | | |
|---|---|---|
| CN | 102959286 A | 3/2013 |
| DE | 3221526 A1 | 12/1983 |
| DE | 3402366 A1 | 8/1985 |
| EP | 0183897 A1 | 6/1986 |
| EP | 0187891 A2 | 7/1986 |
| EP | 0394025 A1 | 10/1990 |
| EP | 0561565 A1 | 9/1993 |
| EP | 1290365 A1 | 11/2005 |
| FR | 1185604 A | 8/1959 |
| FR | 2777336 A1 | 10/1999 |
| FR | 2935453 B1 | 10/2011 |
| GB | 479743 A | 2/1938 |
| GB | 1380410 A | 1/1975 |
| GB | 2193270 A | 2/1988 |
| GB | 2259740 A | 3/1993 |
| JP | S61167780 A | 7/1986 |
| JP | H08219295 A | 8/1996 |
| JP | 2000018261 A | 1/2000 |
| JP | 2000220638 A | 8/2000 |
| JP | 2001050287 A | 2/2001 |
| JP | 2005299730 A | 10/2005 |
| JP | 2011047468 A | 3/2011 |
| WO | 0190610 A1 | 11/2001 |
| WO | 2015143401 A1 | 9/2015 |
| WO | 2015148986 A1 | 10/2015 |

OTHER PUBLICATIONS

International Search Report for PCT/US2015/023110, dated Jun. 19, 2015, 1 page.

International Search Report for PCT/US2015/021875, dated Jun. 19, 2015, 1 page.

Supplementary European Search Report for EP15768475 dated Feb. 5, 2018, 8 pages.

* cited by examiner

ROTARY SHAFT HOUSING AND SEAL

TECHNICAL FIELD

The present disclosure relates to rotary shaft seal housings and rotary shaft seals, and more particularly, to rotary shaft seals having a crimped flange.

BACKGROUND ART

A rotary, or reciprocating, machine can feature an enclosed internal mechanism that drives a shaft. In some cases, the shaft can pass through the housing of the machine on one or both ends. In such cases, a rotary shaft seal, sometimes referred to as a lip seal, can be disposed near an exit point to retain a lubricating fluid, such as oil or grease, in the housing as well as prevent ingress of contaminants, such as moisture and dust. The rotary shaft seal can have an outer diameter that provides a seal against the housing, and a sealing lip that provides a seal against the shaft. The sealing lip should exert a radial load on the shaft that provides sufficient sealing properties without excessive friction or wear.

There continues to exist a need for a rotary shaft seal having improved sealing properties.

BRIEF DESCRIPTION OF THE DRAWINGS

Embodiments are illustrated by way of example are not limited in the accompanying figures.

Figure 1:
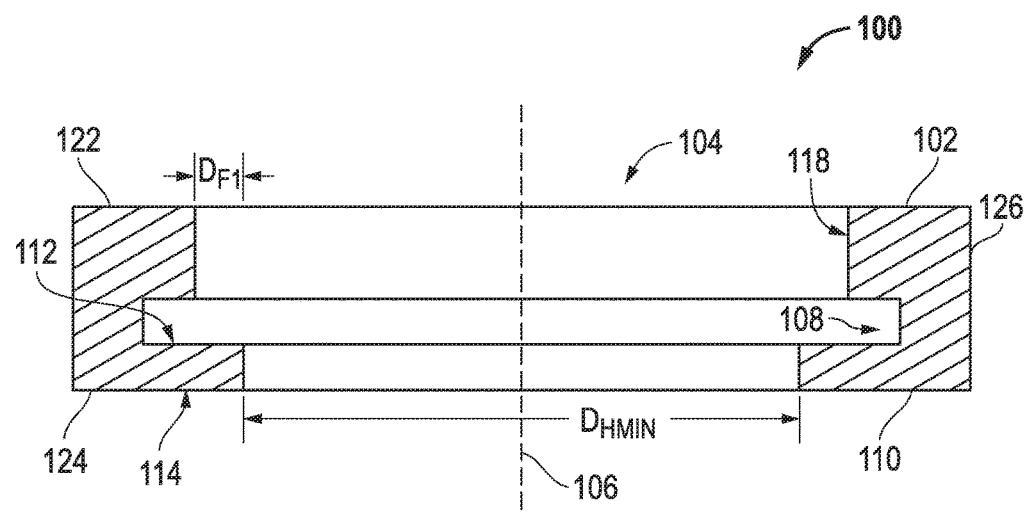
FIG. 1 includes a cross-sectional side view of a rotary shaft seal housing in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "substantially" refers to a deviation of less than about 5% of the value as described in the whole state, such as less than about 4% of the value as described in the whole state, or even less than about 2% of the value as described in the whole state. For example, the phrase "substantially devoid" may refer to a characteristic that is at least about 95% devoid, such as at least about 96% devoid, or even at least 98% devoid of that characteristic.

As used herein, all standards are to be construed as the standard in place as of the time of the effective date. Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

A rotary shaft seal housing in accordance with one or more of the embodiments described herein can generally include a body having an aperture defining a central axis and a flange extending from the body towards the central axis.

A rotary shaft seal in accordance with one or more of the embodiments described herein can generally include a housing comprising a body having an aperture defining a central axis and a flange extending from the body towards the central axis. The rotary shaft seal can further include a sealing element secured between the housing and the flange. In this regard, the sealing element can be crimped within a cavity of the housing.

The flange includes a first surface contiguous with the cavity, a second surface opposite the first surface, and a third surface extending between the first and second surfaces. In particular embodiments, the first surface can be generally smooth and the third surface can extend towards the central axis a distance beyond the inner surface of the body. In more particular embodiments, the second surface can be generally smooth. In operation, the rotary shaft seal can be installed between a shaft and a bore, forming a seal therebetween.

Figure 2:
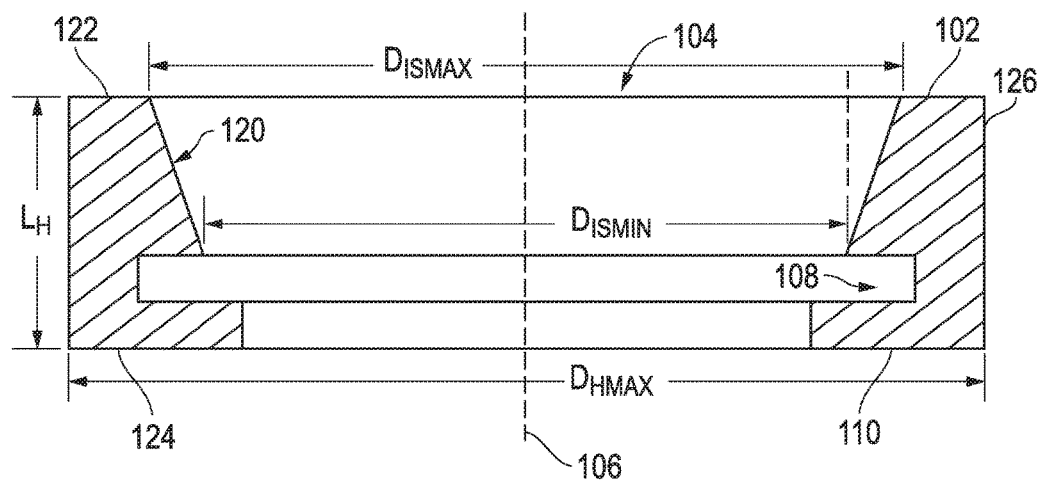
FIG. 2 includes a cross-sectional view of another rotary shaft seal housing in accordance with an embodiment.

Referring initially to FIGS. 1 and 2, a housing 100 in accordance with embodiments described herein can generally include a body 102 and a flange 110 extending from the body 102. The body can have an aperture 104 defining a central axis 106 and a cavity 108 concentric to the central axis 106. The flange 110 can extend radially inward from the body 102 toward the central axis 106.

Referring to FIG. 1, in particular embodiments, the aperture 104 further defines an inner surface 118 of the body 102. The inner surface 118 extends in a direction generally parallel with the central axis 106. As used herein, the phrases "generally parallel" and "substantially parallel" are interchangeable and refer to an angular offset between two axes or planes of less than about 1°, such as less than about 0.5°, or even less than about 0.25°.

The flange 110 can include a surface 112, a surface 114 opposite the surface 112, and a surface 116 extending between the surfaces 112 and 114. The surface 112 of the flange 110 can be contiguous with the cavity 108, such that the surface 112 is coplanar with an axial end of the cavity 108. In such a manner, the surface 112 can act as a bounding wall of the cavity 108.

As contemplated herein, the surface 112 can be generally smooth, for example, it is free from projections, notches, grooves, channels, serrations, bumps, or any combination thereof. After reading this application, those skilled in the art will understand that surface roughness, such as caused during the normal manufacturing of the rotary shaft seal housing 100, constitutes "generally smooth" as used herein. The term "smooth" as used herein can generally refer to an enhanced surface finish, for example, polished, buffed, etc. A smooth, or generally smooth, surface 112 can help to facilitate greater operable life expectancy of the rotary shaft seal 1 by reducing the propensity of the rotary shaft seal housing 100 to bite, puncture, or otherwise mark the sealing element, as will be described in greater detail below.

As also contemplated herein, the surfaces 114 and 116 can be generally smooth, for example, the surfaces 114 and 116 are free from projections, notches, grooves, channels, serrations, bumps, or any combination thereof, with the exception of those caused during the normal manufacturing of the rotary shaft seal housing 100. In yet further embodiments, the surfaces 114 and 116 can be smooth.

In a particular embodiment, the surfaces 112 and 114 of the flange 110 can be substantially parallel. Alternatively, the surfaces 112 and 114 can be offset from each other by a relative angle therebetween. The surface 116 can extend perpendicular to surface 112 or surface 114. In this regard, the surface 116 can extend generally parallel with the central axis 106. While the surface 116 can be arranged to be nonparallel with the central axis 106, it should be understood by one of ordinary skill that such arrangement creates an acute angled edge that may damage the sealing member during prolonged operation.

In particular embodiments, the surface 116 can form an innermost surface of the housing 100. In such a manner, the housing 100 can have a minimum radial diameter, $D_{HMIN}$, as measured between diametrically opposite locations along the third surface 116. The inner surface 118 of the body 102 can have a diameter that is greater than $D_{HMIN}$ by a distance, $D_{F1}$, as measured in a direction perpendicular to the central axis 106.

In particular embodiments, a ratio of the diameter of the inner surface 118 to $D_{HMIN}$ can be at least about 1.1:1.0, such as at least about 1.2:1.0, at least about 1.3:1.0, or even at least about 1.4:1.0. Moreover, the ratio of the diameter of the inner surface 118 to $D_{HMIN}$ may not be greater than about 3.0:1.0, such as no greater than about 2.5:1, or even no greater than about 2.0:1.0. The ratio of the diameter of the inner surface 118 to $D_{HMIN}$ can also be within a range between and including any of the values described above, such as, for example, between about 1.2:1.0 and about 1.3:1.0.

Referring now to FIG. 2, in particular embodiments, the aperture 104 can further define an inner surface 120 of the body 102 extending in a direction that is not parallel with the central axis 106. In this regard, the inner surface 120 can be disposed at a relative angle, β, as measured with respect to the central axis 106, wherein β is at least about 1°, such as at least about 5°, at least about 15°, at least about 25°, or even at least about 45°. Moreover, β can be no greater than about 80°, such as no greater than about 75°, no greater than about 70°, no greater than about 65°, no greater than about 60°, no greater than about 55°, or even no greater than about 50°. β can also be within a range between and including any of the values described above, such as, for example, between about 20° and about 30°.

In yet a more particular embodiment, β is in a range of about 20° and about 25°. Within this range, the inner surface 120 can have a minimum diameter, $D_{ISMIN}$, and a maximum diameter, $D_{ISMAX}$, wherein a ratio of $D_{ISMAX}:D_{ISMIN}$ is at least about 1.1:1.0, such as at least about 1.15:1.0, or even at least about 1.2:1.0. Moreover, the ratio of $D_{ISMAX}:D_{ISMIN}$ can be no greater than about 3.0:1.0, such as no greater than about 2.0:1.0, or even no greater than about 1.5:1.0. In further embodiments, the ratio of $D_{ISMAX}:D_{ISMIN}$ can be within a range between and including any of the values described above, such as, for example, between about 1.15:1.0 and about 1.20:1.0. Having a ratio within the above described ranges may permit the rotary shaft seal housing 100 to adjust for axial misalignment of an inner component disposed therein by allowing the inner component a greater opening in which to bend, while simultaneously providing sufficient structural integrity to maintain the operable life expectancy of the rotary shaft seal 1.

As contemplated herein, and as illustrated in FIG. 2, when viewed in cross section, the inner surface 120 of the body 102 can lie along a straight line. In this regard, the inner surface 120 can have a generally frustoconical shape. In an alternate embodiment (not illustrated), when viewed in cross section, the inner surface 120 can lie along an arcuate line so as to have a concave or convex shape. In yet another embodiment (not illustrated), when viewed in cross section, the inner surface 120 can have a step-like, or serrated, shape. One of ordinary skill in the art will recognize that the inner surface 120 can have any number or combination of shapes without changing the sealing performance of the rotary shaft seal 1.

As illustrated in FIGS. 1 and 2, the housing 100 can be monolithic, such that it can be manufactured from a contiguous piece of material. In particular embodiments, the housing 100 can generally comprise a copper-zinc alloy. In more particular embodiments, the housing 100 can further comprise lead.

In certain embodiments, the housing 100 can comprise a material having a Brinell hardness (HB) in a range of about 70 to about 150, such as in a range of about 75 to about 145, in a range of about 80 to about 140, in a range of about 85 to about 135, in a range of about 90 to about 130, in a range of about 95 to about 125, in a range of about 100 to about 120, or even in a range of about 105 to about 115.

In particular embodiments, the housing 100 can comprise a material having a tensile strength of at least about 350 MPa, such as at least about 360 MPa, at least about 370 MPa, at least about 380 MPa, at least about 390 MPa, at least about 400 MPa, or even at least about 410 MPa. Moreover, the housing 100 can comprise a material having a tensile strength of no greater than about 480 MPa, such as no greater than about 470 MPa, no greater than about 460 MPa, no greater than about 450 MPa, no greater than about 440 MPa, no greater than about 430 MPa, no greater than about 420 MPa, or even no greater than about 410 MPa. The rotary shaft seal housing can also comprise a tensile strength within a range between and including any of the values described above, such as, for example, between about 375 MPa and about 410 MPa.

In further embodiments, the housing 100 can comprise a material having a modulus of elasticity of no less than about 80 GPa, such as no less than about 90 GPa, no less than about 100 GPa, no less than about 110 GPa, no less than about 120 GPa, or even no less than about 130 GPa. Moreover, the housing 100 can comprise a material having a modulus of elasticity of no greater than about 300 GPa, such as no greater than about 275 GPa, no greater than about 250 GPa, no greater than about 225 GPa, no greater than about 200 GPa, no greater than about 175 GPa, or even no greater than about 150 GPa. The housing 100 can also comprise a material having a modulus of elasticity within a range between and including any of the values described above, such as, for example, between about 125 GPa and about 150 GPa.

Material properties for the housing 100, such as those described above, can generally provide sufficient structural integrity to increase the operable life expectancy of the rotary shaft seal 1 without unnecessarily increasing the brittleness or weight of the housing 100. In this regard, the rotary shaft seal 1 can be adapted to adjust for mechanical wear, for example, not increase in leakage rate of more than about 1%, for at least about 6 million cycles, such as at least about 7 million cycles, at least about 10 million cycles, at least about 15 million cycles, or even at least about 20 million cycles.

To further increase operable life expectancy of the rotary shaft seal 1, it may be desirable that the housing 100 be devoid, or substantially devoid, of structural cracking or pitting, which may cause or accelerate fatigue and failure.

In certain applications the housing may be exposed to caustic or potentially damaging fluid. In such applications, a surface coating may be applied to the housing in order to mitigate, or eliminate, direct contact of the fluids on the housing. In certain applications, it may be necessary to surface treat the housing using a mechanical or chemical process. In particular embodiments, the housing can be treated using one or more techniques, such as, for example, laser melting or ablation, mechanical sandblasting or chemical picking. In further embodiments, the housing can be treated by galvanizing, chromate or phosphate treatments, or anodizing. It should be understood that the rotary shaft seal 1 in accordance with this disclosure is not intended to be limited by the material selection of the housing 100, and that the above description is merely exemplary.

As illustrated in FIGS. 1 and 2, the housing 100 can further comprise a first axial end 122 and a second axial end 124 opposite the first axial end 122. The first and second axial ends 122 and 124 can be generally parallel. Moreover, the first and second axial ends 122 and 124 can be orientated along a plane that the first and second axial ends 122 and 124 are generally perpendicular to the central axis 106. A radially outermost surface 126 extends between the first and second axial ends 122 and 124 and has a length, $L_H$. In particular embodiments, a ratio of $L_H$ to a diameter, $D_{HMAX}$, of the radially outermost surface 126, can be at least about 1:5, such as at least about 1:4, or even at least about 1:3. In further embodiments, the ratio of $L_H:D_{HMAX}$ can be no greater than about 2:1, such as no greater than about 1:1, or even no greater than about 1:2. The ratio of $L_H:D_{HMAX}$ can also be within a range between and including any of the values described above, such as, for example, between about 1.0:4.5 and about 1.0:3.5.

Figure 3:
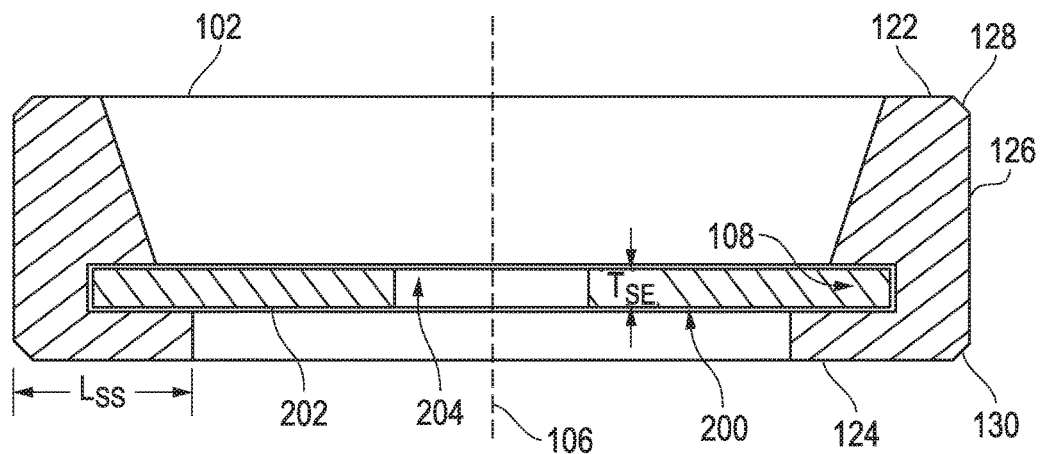
FIG. 3 includes a cross-sectional view of an unfinished rotary shaft seal, as seen along Line 3-3 of FIG. 4, in accordance with an embodiment.

In particular embodiments, such as, for example, as shown in FIG. 3, the radially outermost surface 126 can comprise a bevel 128 at the first axial end 122 of the body 102, or a bevel 130 at the second axial end 124 of the body 102. The bevels 128 and 130 can extend at least partially, or entirely, around a circumference of the body 102. The bevels 128 and 130 can reduce the weight of the housing 101, facilitate easier assembly of the housing 100 into a bore of an outer component (not shown) by creating a guide portion, reduce damage resulting from impact of the housing 100 into a surface of the outer component, or provide another suitable benefit, or any combination thereof.

Figure 4:
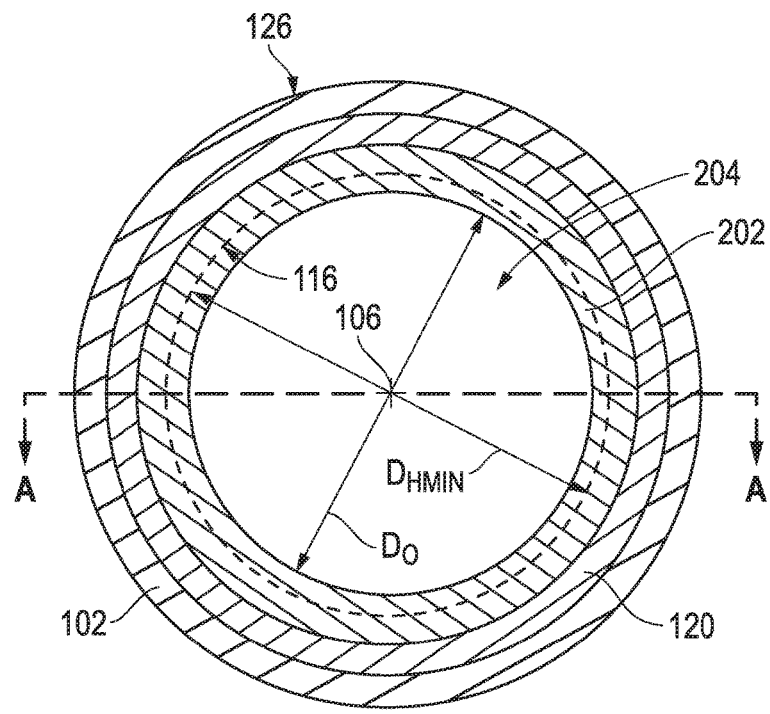
FIG. 4 includes a top view of an unfinished rotary shaft seal in accordance with an embodiment.

As illustrated in FIG. 3, the rotary shaft seal 1 includes the housing 100, as described above, and a sealing element 200 disposed within the cavity 108 of the housing 100. As illustrated in FIG. 4, the flange 110 can be bent axially in a direction toward the sealing element 200 to secure the sealing element 200 at least partially within the housing 100. In this regard, the sealing element 200 can be crimped within the cavity 108 by the combination of the body 102 and the flange 110.

Figure 5:
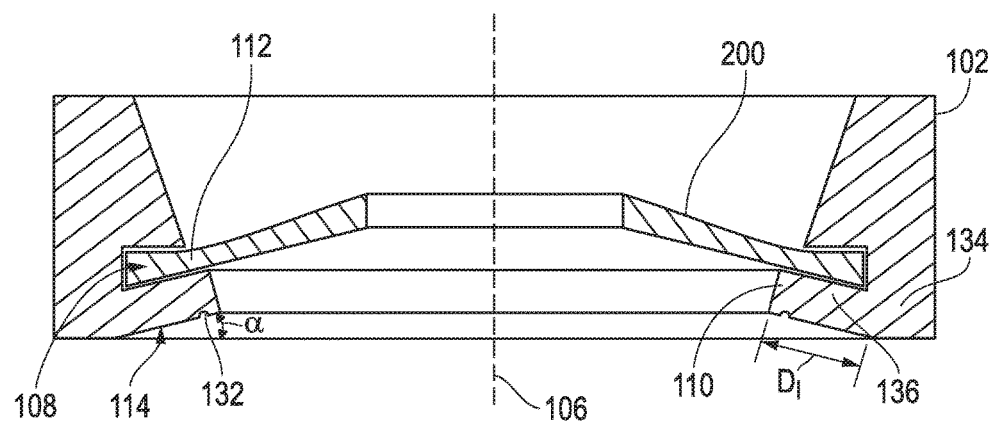
FIG. 5 includes a cross-sectional view of a rotary shaft seal in accordance with an embodiment.

Referring to FIGS. 3 and 5, the sealing element 200 can generally comprise a body 202 having an opening 204 extending therethrough. The body 202 can be annular, or generally annular, and can fit within the cavity 108. The opening 204 can be centrally located within the body 202 such that a central axis 106 of the body is coaxial with a central axis of the opening 204.

As illustrated in FIG. 4, the opening 204 can define a diameter, $D_O$. In particular embodiments, $D_O$ is no greater than about 0.75 $D_{HMIN}$, such as no greater than about 0.60 $D_{HMIN}$, or even no greater than about 0.50 $D_{HMIN}$. In further embodiments, $D_O$ is no less than about 0.05 $D_{HMIN}$, such as no less than about 0.20 $D_{HMIN}$, or even no less than about 0.40 $D_{HMIN}$. Moreover, $D_O$ can be within a range between and including any of the values described above, such as, for example, between about 0.45 $D_{HMIN}$ and about 0.55 $D_{HMIN}$.

Referring again to FIG. 3, the sealing element 200 has a thickness, $T_{SE}$, as measured prior to crimping the sealing element 200 within the cavity 108, and as measured in a direction parallel with the central axis 106 of the housing 100. In particular embodiments, $T_{SE}$ can be no greater than about 0.5 mm, such as no greater than about 0.45 mm, or even no greater than about 0.38 mm. Moreover, $T_{SE}$ can be no less than about 0.30 mm, such as no less than about 0.32 mm, no less than about 0.35 mm, or even no less than about 0.37 mm. $T_{SE}$ can also be within a range between and including any of the values described above, such as, for example, between about 0.35 mm and about 0.40 mm. Previously known rotary shaft seals that use a crimped sealing element have a sealing element gripping surface with a high surface roughness, for example, as caused by projections, notches, grooves, channels, serrations, bumps, or any combination thereof. Such rotary shaft seals generally require the use of thicker sealing elements in order to prevent puncture or tearing of the sealing element during manufacture and operation of the rotary shaft seal. Otherwise, any unusually high radial or axial forces exhibited on the sealing element during manufacture and operation may reduce sealing characteristics and performance. Smooth sealing element engagement surfaces, such as those exhibited by the surfaces 112 and 116 of the flange 110 may reduce unnecessary bite, or puncture, into the sealing element 200 and can enhance the effective operable life expectancy of the rotary shaft seal 1.

A particular advantage of sealing elements 200 having a small $T_{SE}$ (for example, less than about 0.40 mm) is that they can exhibit increased flexibility which can allow the sealing member to operate with smaller or more delicate inner components. In this regard, the rotary shaft seal 1 in accordance with the embodiments herein can receive and provide effective sealing with inner components having diameters of no greater than about 20 mm, such as no greater than about 15 mm, no greater than about 10 mm, no greater than about 7 mm, or even no greater than about 6 mm.

To affect sufficient structural integrity of the sealing element 200, in particular embodiments, the sealing element 200 can comprise a material having a modulus of elasticity of no less than about 0.01 GPa, such as no less than about 0.05 GPa, no less than about 0.1 GPa, or even no less than about 0.5 GPa. In further embodiments, the sealing element 200 can comprise a material having a modulus of elasticity of no greater than about 5 GPa, such as no greater than about 4 GPa, no greater than about 3 GPa, no greater than about 2 GPa, no greater than about 1 GPa, or even no greater than about 0.75 GPa. Moreover, in yet further embodiments, the sealing element 200 can comprise a material having a modulus of elasticity within a range between and including any of the values described above, such as, for example, between about 0.6 GPa and about 0.8 GPa.

In particular embodiments, the sealing element 200 can comprise a material having a flexural modulus, as measured according to ASTM D790, of no less than about 200 MPa, such as no less than about 250 MPa, no less than about 300 MPa, no less than about 350 MPa, or even no less than about 400 MPa. In further embodiments, the sealing element 200 can comprise a material having a flexural modulus of no greater than about 2,000 MPa, such as no greater than about 1,500 MPa, no greater than about 1,000 MPa, or even no greater than about 750 MPa. Moreover, in yet further embodiments, the sealing element 200 can comprise a material having a flexural modulus within a range between and including any of the values described above, such as, for example, between about 700 MPa and about 750 MPa.

In further embodiments, the sealing element 200 can comprise a material having a coefficient of linear thermal expansion, as measured according to ASTM E228, of no less than about $8\times10^{-5}$ mm/mm° C., no less than about $8.5\times10^{-5}$ mm/mm° C., no less than about $9\times10^{-5}$ mm/mm° C., no less than about $9.5\times10^{-5}$ mm/mm° C., or no less than about $10\times10^{-5}$ mm/mm° C. In further embodiments, the sealing element, can comprise a material having a coefficient of linear thermal expansion of no greater than about $15\times10^{-5}$ mm/mm° C., no greater than about $13\times10^{-5}$ mm/mm° C., no greater than about $12\times10^{-5}$ mm/mm° C., or no greater than about $11\times10^{-5}$ mm/mm° C. Moreover, in yet further embodiments, the sealing element 200 can comprise a material having a coefficient of linear thermal expansion within a range between and including any of the values described above, such as, for example, between about $9.5\times10^{-5}$ mm/mm° C. and about $10\times10^{-5}$ mm/mm° C.

In certain embodiments, the sealing element 200 can comprise a material having a static coefficient of friction, as measured against polished steel, within a range between about 0.01 and about 0.20, such as between about 0.02 and about 0.15, or even between about 0.04 and about 0.10.

The sealing element 200 can at least partially comprise a polymer. In certain embodiments, the amount of polymer in the sealing element 200 can be reduced to accommodate a filler, which can improve the lubrication and wear rate of the rotary shaft seal 1. For example, the polymer may be present in sealing element 200 in an amount of no greater than about 98 wt %, such as no greater than about 95 wt %, or even no greater than about 92 wt %. In further embodiments, the polymer can be present in the sealing element 200 in an amount sufficient to maintain the structural integrity of the sealing element 200. For example, the polymer can be present in the sealing element 200 in an amount of at least about 60 wt %, such as at least about 70 wt %, at least about 85 wt %, or even at least about 88 wt %. Moreover, the polymer can be present in the sealing element 200 in an amount within a range between and including any of the values described above, such as, for example, between about 85 wt % and about 92 wt %. The above values are based on the total weight of the sealing member 200.

One particular polymer for use in the sealing element 200 is a fluoropolymer. In a particular embodiment, the fluoropolymer can include a polytetrafluoroethylene (PTFE).

Any of the previously described sealing elements 200 can further include a filler. The filler can improve the lubrication and wear rate of the sealing element 200. In an embodiment, the filler can be present in the sealing element 200 in an amount of at least about 2 wt %, such as at least about 5 wt %, or even at least about 8 wt %. Too much filler (for example, greater than 40 wt %) may adversely affect the sealing properties or structural integrity of the sealing element 200. Rotary shaft seals depend on the sealing element to stretch and be resilient. Thus, the fillers are present in the sealing element 200 in an amount of no greater than about 40 wt %, such as no greater than about 30 wt %, no greater than about 25 wt %, or even no greater than about 15 wt %. Moreover, the filler can be present in the sealing element 200 in an amount within a range between and including any of the values described above, such as, for example, between about 8 wt % and about 15 wt %. The above values are based on the total weight of the sealing member 200.

The filler can include a metallic filler, a glass fiber, a polymer powder, a ceramic, an aramid, a carbon, a molybdenum disulfide, or any combination thereof. Moreover, the filler can include a wallonstonite, a mica, a barium sulfate, a tungsten disulfide, a nickel powder, a polyphenyl sulfide (PPS), a crosslinked polytetrafluoroethylene, a polyimide (PI), a polyether ether ketone (PEEK), a bronze, a silicon carbide, a boron nitride, a carbon fiber, a powder coated with various metallic, a polybenzimidazole (PBI), or any combination thereof.

As illustrated in FIG. 5, the sealing element 200 may be disposed within the cavity 108 of the housing 102 at a location between the body 100 and the surface 112 of the flange 110. During manufacturing of the rotary shaft seal 1, the flange 110 can be crimped, or bent, in an axial direction toward the sealing element 200. In this regard, the sealing element 200 can form a compression fit between the body 102 and the surface 112 of the flange 110.

In certain embodiments, after manufacturing, and as illustrated in FIG. 5, the flange 110 can define a portion 134 disposed at an orientation generally perpendicular to the central axis 106, and a portion 136 disposed at an angle, α, as measured relative to the portion 134. In a particular embodiment, α can be at least about 1°, such as at least about 2°, at least about 3°, at least about 4°, at least about 5°, at least about 10°, at least about 15°, or even at least about 20°. In a further embodiment, α can be no greater than about 45°, such as no greater than about 40°, no greater than about 35°, no greater than about 30°, or even no greater than about 25°. Moreover, α can be within a range between and including any of the values described above, such as, for example, between about 10° and about 15°.

At least one indentation 132 may be disposed on the surface 114 of the flange 110 as an artifact left from the process of crimping the flange 110. The at least one indentation 132 can be spaced apart from the surface 116 of the flange 110 by a radial distance, $D_I$. Referring again to FIG. 3, the surface 114 can have a radial length, $L_{SS}$, as measured from the third surface 116 to the radial outermost surface 126. In particular embodiments, $L_{SS}/D_I$ can be at least about 2, such as at least about 3, at least about 4, at least about 5, at least about 10, or even at least about 15. In further embodiments, $L_{SS}/D_I$ can be no greater than about 30, such as no greater than about 25, or even no greater than about 20. Moreover, $L_{SS}/D_I$ can be within a range between and including any of the values described above, such as, for example, between about 4 and about 5. A ratio of $L_{SS}/D_I$ that is too low (for example, 1.1) or too high (for example, 20) may cause the housing 100 to crack during manufacturing as the forces used to crimp the flange 110 may be too close to an end surface of the housing 100, for example, the surface 116 or the radially outermost surface 126.

In certain embodiments, the at least one indentation 132 can lie along a generally circular path. In further embodiments, the at least one indentation 132 can be generally concentric with the central axis 106 of the housing 102.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A rotary shaft seal housing comprising:
a body having an aperture defining a central axis and an inner surface, the body defining a cavity concentric to the central axis of the aperture and extending outward from the central axis and into the body; and
a flange extending inward toward the central axis a distance beyond the inner surface, the flange having a first surface contiguous with the cavity and a second surface opposite the first surface,
wherein the cavity is adapted to hold a sealing element, and wherein the first surface is generally smooth.

Item 2. A rotary shaft seal comprising:
a housing including:
  a body having an aperture defining a central axis and an inner surface, the body defining a cavity concentric to the central axis of the aperture and extending outward from the central axis and into the body; and
  a flange extending inward toward the central axis, the flange having a first surface contiguous with the cavity, a second surface opposite the first surface, and a third surface extending therebetween; and
a sealing element positioned at least partially within the cavity of the body,
wherein the first and third surfaces are generally smooth, and wherein the first surface is crimped against the sealing element.

Item 3. A rotary shaft seal comprising:
a housing including a body having an aperture defining a central axis and an inner surface, the body defining a cavity extending outward from the central axis and into the body, and a flange extending inward toward the central axis, the flange having a first surface contiguous with the cavity and a second surface opposite the first surface; and
a sealing element secured within the cavity of the body, the sealing element having an undeformed thickness, $T_{SE}$, as measured in a direction parallel with the central axis of the aperture, wherein $T_{SE}$ is no greater than about 0.5 mm, wherein the rotary shaft seal is adapted to operate for at least about 5 million cycles.

Item 4. The rotary shaft seal housing or rotary shaft seal of any one of items 1-3, wherein, when viewed in a plane extending radially from the central axis, at least a portion of the inner surface is disposed at an angle, β, as measured with respect to the central axis, and wherein β is at least about 1°, at least about 5°, at least about 10°, at least about 15°, at least about 20°, at least about 25°, at least about 30°, at least about 35°, at least about 40°, or at least about 45°.

Item 5. The rotary shaft seal housing or rotary shaft seal of item 4, wherein β is no greater than about 80°, no greater than about 75°, no greater than about 70°, no greater than about 65°, no greater than about 60°, no greater than about 55°, or no greater than about 50°.

Item 6. The rotary shaft seal housing or rotary shaft seal of any one of the preceding items, wherein the inner surface has a minimum diameter, $D_{ISMIN}$, and a maximum diameter, $D_{ISMAX}$, and wherein a ratio of $D_{ISMAX}:D_{ISMIN}$ is no greater than about 3:1, no greater than about 2:1, or no greater than about 1.5:1.

Item 7. The rotary shaft seal housing or rotary shaft seal of item 6, wherein $D_{ISMAX}:D_{ISMIN}$ is at least about 1.1:1, at least about 1.15:1, or at least about 1.2:1.

Item 8. The rotary shaft seal housing or rotary shaft seal of any one of the preceding items, wherein, when viewed in cross section, the inner surface lies along a straight line.

Item 9. The rotary shaft seal housing or rotary shaft seal of any one of the preceding items, wherein the first and second surfaces of the flange are substantially parallel.

Item 10. The rotary shaft seal housing or rotary shaft seal of any one of items 1 or 3-9, wherein the flange further comprises a third surface extending between the first and second surfaces.

Item 11. The rotary shaft seal housing or rotary shaft seal of any one of items 2 or 10, wherein the first, second, and third surfaces are generally smooth.

Item 12. The rotary shaft seal housing or rotary shaft seal of any one of items 2, 10, or 11, wherein the first, second, and third surfaces are smooth.

Item 13. The rotary shaft seal housing or rotary shaft seal of any one items 2 or 10-12, wherein the central axis is closer to the third surface than the inner surface of the housing.

Item 14. The rotary shaft seal of any one of the preceding items, wherein the second surface includes at least one indentation.

Item 15. The rotary shaft seal of item 14, wherein the at least one indentation is spaced apart from the third surface of the flange.

Item 16. The rotary shaft seal of any one of items 14 or 15, wherein, when viewed in a plane extending radially from the central axis, the second surface has a length, $L_{SS}$, as measured from the third surface, wherein the at least one indentation is spaced apart from the third surface by a distance, $D_I$, and wherein $L_{SS}/D_I$ is at least about 2, at least about 3, at least about 4, at least about 5, at least about 10, or at least about 15.

Item 17. The rotary shaft seal of item 16, wherein $L_{SS}/D_I$ is no greater than about 30, no greater than about 25, or no greater than about 20.

Item 18. The rotary shaft seal of any one of items 14-17, wherein the at least one indentation lies along a generally circular path.

Item 19. The rotary shaft seal of any one of items 14-18, wherein the at least one indentation is generally concentric with the central axis.

Item 20. The rotary shaft seal of any one of items 2-19, wherein, when viewed in a plane extending radially from the central axis, the second surface further comprises:
- a first portion disposed at an orientation generally perpendicular with the central axis; and
- a second portion disposed at an angle, α, as measured relative to the first portion.

Item 21. The rotary shaft seal of item 20, wherein α is at least about 1°, at least about 2°, at least about 3°, at least about 4°, at least about 5°, at least about 10°, at least about 15°, or at least about 20°.

Item 22. The rotary shaft seal of any one of items 16 or 17, wherein α is no greater than about 45°, no greater than about 40°, no greater than about 35°, no greater than about 30°, or no greater than about 25°.

Item 23. The rotary shaft seal housing or rotary shaft seal of any one of the preceding items, wherein the housing comprises a copper-zinc alloy.

Item 24. The rotary shaft seal housing or rotary shaft seal of item 23, wherein the housing further comprises a lead.

Item 25. The rotary shaft seal housing or rotary shaft seal of any one of the preceding items, wherein the housing comprises a material having a Brinell hardness (HB) in a range of about 70 to about 150, in a range of about 75 to about 145, in a range of about 80 to about 140, in a range of about 85 to about 135, in a range of about 90 to about 130, in a range of about 95 to about 125, in a range of about 100 to about 120, or in a range of about 105 to about 115.

Item 26. The rotary shaft seal housing or rotary shaft seal of any one of the preceding items, wherein the housing comprises a material having a tensile strength of at least about 350 megapascal (MPa), at least about 360 MPa, at least about 370 MPa, at least about 380 MPa, at least about 390 MPa, at least about 400 MPa, or at least about 410 MPa.

Item 27. The rotary shaft seal housing or rotary shaft seal of any one of the preceding items, wherein the housing comprises a material having a tensile strength of no greater than about 480 MPa, no greater than about 470 MPa, no greater than about 460 MPa, no greater than about 450 MPa, no greater than about 440 MPa, no greater than about 430 MPa, no greater than about 420 MPa, or no greater than about 410 MPa.

Item 28. The rotary shaft seal housing or rotary shaft seal of any one of the preceding items, wherein the housing comprises a material having a modulus of elasticity of no less than about 80 gigapascal (GPa), no less than about 90 GPa, no less than about 100 GPa, no less than about 110 GPa, no less than about 120 GPa, or no less than about 130 GPa.

Item 29. The rotary shaft seal housing or rotary shaft seal of any one of the preceding items, wherein the housing comprises a material having a modulus of elasticity of no greater than about 300 GPa, no greater than about 275 GPa, no greater than about 250 GPa, no greater than about 225 GPa, no greater than about 200 GPa, no greater than about 175 GPa, or no greater than about 150 GPa.

Item 30. The rotary shaft seal housing or rotary shaft seal of any one of the preceding items, wherein the housing is substantially devoid of structural cracking.

Item 31. The rotary shaft seal housing or rotary shaft seal of any one of the preceding items, wherein the housing is devoid of structural cracking.

Item 32. The rotary shaft seal housing or rotary shaft seal of any one of the preceding items, wherein the housing further comprises a surface coating.

Item 33. The rotary shaft seal housing or rotary shaft seal of any one of the preceding items, wherein the housing is surface treated.

Item 34. The rotary shaft housing or rotary shaft seal of any one of the preceding items, wherein the housing further comprises:
- a first axial end;
- a second axial end; and
- a radially outermost surface extending between the first and second axial ends.

Item 35. The rotary shaft seal housing or rotary shaft seal of item 34, wherein the radially outermost surface comprises a first bevel at the first axial end.

Item 36. The rotary shaft seal housing or rotary shaft seal of item 35, wherein the radially outermost surface further comprises a second bevel at the second axial end.

Item 37. The rotary shaft seal housing or rotary shaft seal of any one of items 34-36, wherein the radially outermost surface of the housing has an axial length, $L_H$, as measured from the first axial end to the second axial end, wherein the radially outermost surface of the housing has a diameter, $D_{HMAX}$, and wherein $L_H:D_{HMAX}$ is at least about 1:5, at least about 1:4, or at least about 1:3.

Item 38. The rotary shaft seal housing or rotary shaft seal of item 37, wherein $L_H:D_{HMAX}$ is no greater than about 2:1, no greater than about 1:1, or no greater than about 1:2.

Item 39. The rotary shaft seal housing or rotary shaft seal of any one of the preceding items, wherein the sealing element comprises a material having a modulus of elasticity of no less than about 0.01 gigapascal (GPa), no less than about 0.05 GPa, no less than about 0.1 GPa, or no less than about 0.5 GPa.

Item 40. The rotary shaft seal housing or rotary shaft seal of any one of the preceding items, wherein the sealing element comprises a material having a modulus of elasticity of no greater than about 5 GPa, no greater than about 4 GPa, no greater than about 3 GPa, no greater than about 2 GPa, no greater than about 1 GPa, or no greater than about 0.75 GPa.

Item 41. The rotary shaft seal housing or rotary shaft seal of any one of the preceding items, wherein the sealing element comprises a material having a Flexural Modulus, as measured according to ASTM D790, of no less than about 200 megapascal (MPa), no less than about 250 MPa, no less than about 300 MPa, no less than about 350 MPa, or no less than about 400 MPa.

Item 42. The rotary shaft seal housing or rotary shaft seal of any one of the preceding items, wherein the sealing element comprises a material having a Flexural Modulus, as measured according to ASTM D790, of no greater than about 2,000 MPa, no greater than about 1,500 MPa, no greater than about 1,000 MPa, or no greater than about 750 MPa.

Item 43. The rotary shaft seal housing or rotary shaft seal of any one of the preceding items, wherein the sealing element comprises a material having a coefficient of linear thermal expansion, as measured according to ASTM E228, of no less than about $8 \times 10^{-5}$ mm/mm° C., no less than about $8.5 \times 10^{-5}$ mm/mm° C., no less than about $9 \times 10^{-5}$ mm/mm° C., no less than about $9.5 \times 10^{-5}$ mm/mm° C., or no less than about $10 \times 10^{-5}$ mm/mm° C.

Item 44. The rotary shaft seal housing or rotary shaft seal of any one of the preceding items, wherein the sealing element comprises a material having a coefficient of linear thermal expansion, as measured according to ASTM E228, of no greater than about $15 \times 10^{-5}$ mm/mm° C., no greater than about $13 \times 10^{-5}$ mm/mm° C., no greater than about $12 \times 10^{-5}$ mm/mm° C., or no greater than about $11 \times 10^{-5}$ mm/mm° C.

Item 45. The rotary shaft seal housing or rotary shaft seal of any one of the preceding items, wherein the sealing element comprises a material having a static coefficient of friction against polished steel within a range between about 0.01 and about 0.20, between about 0.02 and about 0.15, or between about 0.04 and about 0.10.

Item 46. The rotary shaft seal housing or rotary shaft seal of any one of the preceding items, wherein the sealing element comprises a fluoropolymer.

Item 47. The rotary shaft seal housing or rotary shaft seal of any one of the preceding items, wherein the sealing element comprises polytetrafluoroethylene (PTFE).

Item 48. The rotary shaft seal housing or rotary shaft seal of any one of the preceding items, wherein the sealing element has an annular shape.

Item 49. The rotary shaft seal housing or rotary shaft seal of any one of the preceding items, wherein, when viewed from a top view, the sealing element comprises an opening.

Item 50. The rotary shaft seal housing or rotary shaft seal of item 49, wherein the opening has a diameter, $D_O$, wherein the housing has a minimum diameter, $D_{HMIN}$, as measured at the flange, and wherein $D_O$ is no greater than about 0.75 $D_{HMIN}$, no greater than about 0.60 $D_{HMIN}$, or no greater than about 0.50 $D_{HMIN}$.

Item 51. The rotary shaft seal housing or rotary shaft seal of item 50, wherein $D_O$ is no less than about 0.05 $D_{HMIN}$, no less than about 0.20 $D_{HMIN}$, or no less than about 0.40 $D_{HMIN}$.

Item 52. The rotary shaft seal according to any one of items 1 or 2, wherein the sealing element has an undeformed thickness, $T_{SE}$, as measured in a direction parallel with the central axis of the aperture, and wherein $T_{SE}$ is no greater than about 0.5 mm Item 53. The rotary shaft seal according to any one of items 3-52, wherein $T_{SE}$ is no greater than about 0.45 mm, no greater than about 0.40 mm, or no greater than about 0.38 mm.

Item 54. The rotary shaft seal according to any one of items 3-53, wherein $T_{SE}$ is no less than about 0.30 mm, no less than about 0.32 mm, no less than about 0.35 mm, or no less than about 0.37 mm.

Item 55. The rotary shaft seal housing or rotary shaft seal of any one of the preceding items, wherein the housing is adapted to receive a shaft through the aperture, the shaft having a diameter of no greater than about 20 mm, no greater than about 15 mm, no greater than about 10 mm, no greater than about 7 mm, or no greater than about 6 mm.

Item 56. The rotary shaft seal of any one of the preceding items, wherein the rotary shaft seal is adapted to operate for at least about 6 million cycles, such as at least about 7 million cycles, at least about 10 million cycles, at least about 15 million cycles, or at least about 20 million cycles.

As compared to conventional rotary shaft seals, the rotary shaft seals in accordance with the concepts as described herein provide enhanced sealing characteristics over extended durations of operable life expectancy. The rotary shaft seals as described herein can exhibit high sealing performance while simultaneously having a low wear rate.

Many different aspects and embodiments are possible. Some of those aspects and embodiments are described below. After reading this specification, skilled artisans will appreciate that those aspects and embodiments are only illustrative and do not limited the scope of the present invention.

In a first aspect, a rotary shaft seal housing can include a body having an aperture defining a central axis and an inner surface, the body defining a cavity concentric to the central axis of the aperture and extending outward from the central axis and into the body. The rotary shaft seal housing can further include a flange extending inward toward the central axis a distance beyond the inner surface of the body, the flange having a first surface contiguous with the cavity and a second surface opposite the first surface. The cavity of the rotary shaft seal housing can be adapted to hold a sealing element. Moreover, the first surface of the flange of the rotary shaft housing can be generally smooth.

In an embodiment of the first aspect, when viewed in a plane extending radially from the central axis, at least a portion of the inner surface of the body can be disposed at an angle, $\delta$, as measured with respect to the central axis, wherein $\delta$ is at least about 1°, such as at least about 5°, at least about 10°, at least about 15°, at least about 20°, at least about 25°, at least about 30°, at least about 35°, at least about 40°, or even at least about 45°. In a further embodiment, $\delta$ can be no greater than about 80°, such as no greater than about 75°, no greater than about 70°, no greater than about 65°, no greater than about 60°, no greater than about 55°, or even no greater than about 50°.

In a second aspect, a rotary shaft seal can include a housing. The housing can include a body having an aperture defining a central axis and an inner surface, the body defining a cavity concentric to the central axis of the aperture and extending outward from the central axis and into the body. The housing can further include a flange extending inward toward the central axis, the flange having a first surface contiguous with the cavity, a second surface opposite the first surface, and a third surface extending therebetween. The housing can further include a sealing element positioned at least partially within the cavity of the body. The first and third surfaces can be generally smooth, and the first surface can be crimped against the sealing element.

In a third aspect, a rotary shaft seal can include a housing and a sealing element. The housing can include a body having an aperture defining a central axis and an inner surface, the body defining a cavity extending outward from the central axis and into the body, and a flange extending inward toward the central axis, the flange having a first surface contiguous with the cavity and a second surface opposite the first surface. The sealing element can be secured within the cavity of the body, the sealing element having an undeformed thickness, $T_{SE}$, as measured in a direction parallel with the central axis of the aperture, wherein $T_{SE}$ is no greater than about 0.5 mm. The rotary shaft seal can be adapted to adjust for mechanical wear for at least about 5 million cycles.

Note that not all of the features described above are required, that a portion of a specific feature may not be required, and that one ore more features may be provided in addition to those described. Still further, the order in which features are described are not necessary the order in which they are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A rotary shaft seal housing comprising:
a body having an aperture defining a central axis and an inner surface, the body defining a cavity concentric to the central axis of the aperture and extending outward from the central axis and into the body, wherein, when viewed in cross section, the inner surface forms a generally frustoconical shape; and
a flange extending inward toward the central axis a distance beyond the inner surface, the flange having a first surface contiguous with the cavity and a second surface opposite the first surface,
wherein the cavity is adapted to hold a sealing element, and wherein the first surface is generally smooth, wherein the sealing element has an undeformed thickness, TSE, as measured in a direction parallel with the central axis of the aperture, wherein TSE is no greater than 0.4 mm, wherein the housing is adapted to receive a shaft through the aperture, the shaft having a diameter of no greater than about 20 mm, wherein the inner surface has a minimum diameter, DISMIN, and a maximum diameter, DISMAX, and wherein a ratio of DISMAX:DISMIN is at least about 1.1:1 and no greater than about 3:1.

2. A rotary shaft seal comprising:
a housing including:
a body having an aperture defining a central axis and an inner surface, the body defining a cavity concentric to the central axis of the aperture and extending outward from the central axis and into the body, wherein, when viewed in cross section, the inner surface forms a generally frustoconical shape; and
a flange extending inward toward the central axis, the flange having a first surface contiguous with the cavity, a second surface opposite the first surface, and a third surface extending therebetween; and
a sealing element positioned at least partially within the cavity of the body,
wherein the first and third surfaces are generally smooth, and wherein the first surface is crimped against the sealing element, wherein the sealing element has an undeformed thickness, TSE, as measured in a direction parallel with the central axis of the aperture, wherein TSE is no greater than 0.4 mm, wherein the housing is adapted to receive a shaft through the aperture, the shaft having a diameter of no greater than about 20 mm, wherein the inner surface has a minimum diameter, DISMIN, and a maximum diameter, DISMAX, and wherein a ratio of DISMAX:DISMIN is at least about 1.1:1 and no greater than about 3:1.

3. A rotary shaft seal comprising:
a housing including a body having an aperture defining a central axis and an inner surface, the body defining a cavity extending outward from the central axis and into the body, and a flange extending inward toward the central axis, the flange having a first surface contiguous with the cavity and a second surface opposite the first surface, wherein, when viewed in cross section, the inner surface forms a generally frustoconical shape; and
a sealing element secured within the cavity of the body, the sealing element having an undeformed thickness, TSE, as measured in a direction parallel with the central axis of the aperture, wherein TSE is no greater than about 0.4 mm,
wherein the rotary shaft seal is adapted to operate for at least about 5 million cycles, wherein the housing is adapted to receive a shaft through the aperture, the shaft having a diameter of no greater than about 20 mm, wherein the inner surface has a minimum diameter, DISMIN, and a maximum diameter, DISMAX, and wherein a ratio of DISMAX:DISMIN is at least about 1.1:1 and no greater than about 3:1.

4. The rotary shaft seal housing of claim 1, wherein, when viewed in cross section, at least a portion of the inner surface is disposed at an angle, $\beta$, as measured with respect to the central axis, and wherein $\beta$ is at least about 1° and no greater than about 80°.

5. The rotary shaft seal housing of claim 1, wherein, when viewed in cross section, the inner surface lies along a straight line.

6. The rotary shaft seal housing of claim 1, wherein the flange further comprises a third surface extending between the first and second surfaces.

7. The rotary shaft seal of claim 2, wherein the first, second, and third surfaces are smooth.

8. The rotary shaft seal of claim 2, wherein the central axis is closer to the third surface than the inner surface of the housing.

9. The rotary shaft seal housing of claim 1, wherein the second surface includes at least one indentation.

10. The rotary shaft seal of claim 9, wherein the at least one indentation is spaced apart from the third surface of the flange.

11. The rotary shaft seal of claim 2, wherein, when viewed in a plane extending radially from the central axis, the second surface further comprises:
a first portion disposed at an orientation generally perpendicular with the central axis; and
a second portion disposed at an angle, a, as measured relative to the first portion.

12. The rotary shaft seal housing of claim 1, wherein the housing is surface treated.

13. The rotary shaft seal of claim 2, wherein TSE is no greater than about 0.35 mm.

14. The rotary shaft seal housing of claim 1, wherein the housing is adapted to receive a shaft through the aperture, the shaft having a diameter of no greater than about 20 mm, no greater than about 15 mm, no greater than about 10 mm, no greater than about 7 mm, or no greater than about 6 mm.

15. The rotary shaft seal housing of claim 1, wherein the first and second surfaces of the flange are substantially parallel.

16. The rotary shaft seal of any one of claim 9, wherein, when viewed in a plane extending radially from the central axis, the second surface has a length, LSS, as measured from the third surface, wherein the at least one indentation is spaced apart from the third surface by a distance, DI, and wherein LSS/DI is at least about 2 and no greater than 20.

17. The rotary shaft seal of claim 9, wherein the at least one indentation lies along a generally circular path.

18. The rotary shaft seal of claim 11, wherein a is at least about 1° and no greater than 45°.

19. The rotary shaft seal housing of claim 1, wherein the housing comprises a copper-zinc alloy.

20. The rotary shaft seal housing of claim 1, wherein at least one indentation is disposed on the surface of the flange.

* * * * *

UNITED STATES PATENT AND TRADEMARK OFFICE
CERTIFICATE OF CORRECTION

PATENT NO. : 10,393,268 B2
APPLICATION NO. : 15/129760
DATED : August 27, 2019
INVENTOR(S) : Andreas Gorol et al.

Page 1 of 1

It is certified that error appears in the above-identified patent and that said Letters Patent is hereby corrected as shown below:

In the Claims

Column 16, Line 56, please delete "at an angle, a, as measured", and insert --at an angle, α, as measured--

Column 17, Line 12, please delete "wherein a is", and insert --wherein α is--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*